(12) United States Patent
Hara (10) Patent No.: US 9,067,627 B2
(45) Date of Patent: Jun. 30, 2015

(54) VEHICLE BODY FRONT PART STRUCTURE

(71) Applicant: Yasuhiro Hara, Toyota (JP)

(72) Inventor: Yasuhiro Hara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/071,082

(22) Filed: Nov. 4, 2013

(65) Prior Publication Data

US 2014/0125030 A1    May 8, 2014

(30) Foreign Application Priority Data

Nov. 7, 2012 (JP) ................. 2012-245514

(51) Int. Cl.
*B62D 21/15* (2006.01)
*B62D 21/11* (2006.01)

(52) U.S. Cl.
CPC .............. *B62D 21/152* (2013.01); *B62D 21/11* (2013.01)

(58) Field of Classification Search
CPC .... B62D 21/155; B62D 21/11; B62D 21/152; B62D 25/2018
USPC ........................... 280/124.109, 784, 124.134; 296/203.02, 204, 187.09; 180/311
See application file for complete search history.

(56) References Cited

U.S. PATENT DOCUMENTS

| | | | |
|---|---|---|---|
| 3,860,258 A * | 1/1975 | Feustel et al. ................. | 180/312 |
| 5,048,888 A * | 9/1991 | Willy et al. .............. | 296/187.03 |
| 5,685,599 A | 11/1997 | Kitagawa | |
| 6,619,730 B2 * | 9/2003 | Porner .......................... | 296/204 |
| 6,631,942 B1 * | 10/2003 | Kitagawa ................... | 296/187.1 |
| 6,672,620 B2 * | 1/2004 | Kawazu et al. ............... | 280/834 |
| 6,824,168 B2 * | 11/2004 | Kawazu et al. ............... | 280/834 |
| 7,976,037 B2 * | 7/2011 | Yoshida et al. ........ | 280/124.109 |
| 8,267,429 B2 * | 9/2012 | Takeshita et al. ............. | 280/784 |
| 8,490,988 B2 * | 7/2013 | Takeshita et al. ....... | 280/124.109 |
| 8,556,336 B2 * | 10/2013 | Yasuhara et al. ......... | 296/193.07 |
| 2003/0189358 A1 | 10/2003 | Watanabe et al. | |
| 2012/0187720 A1 * | 7/2012 | Tomozawa et al. ...... | 296/187.09 |
| 2012/0256446 A1 * | 10/2012 | Yasuhara et al. ......... | 296/193.07 |

FOREIGN PATENT DOCUMENTS

| | | |
|---|---|---|
| JP | A-08-207832 | 8/1996 |
| JP | A-08-239056 | 9/1996 |
| JP | A-2000-006840 | 1/2000 |
| JP | A-2003-300484 | 10/2003 |
| JP | A-2004-114813 | 4/2004 |
| JP | A-2005-138652 | 6/2005 |
| JP | 2005271811 A * | 10/2005 |
| JP | A-2008-056115 | 3/2008 |
| JP | A-2008-290539 | 12/2008 |
| JP | A-2009-018690 | 1/2009 |
| JP | A-2009-298214 | 12/2009 |
| JP | A-2013-129384 | 7/2013 |

* cited by examiner

*Primary Examiner* — Drew Brown
(74) *Attorney, Agent, or Firm* — Oliff PLC (57) ABSTRACT

A vehicle body front part structure includes: a lower arm that supports a front wheel; a first transverse member that is connected to a supporting part on a rear side of the lower arm in a vehicle body; a second transverse member that connects between parts on a front end side of a rocker, the rocker is disposed in a rear of the wheel; and a connecting structure that integrally connects between the first transverse member and the second transverse member.

6 Claims, 7 Drawing Sheets

VEHICLE BODY FRONT PART STRUCTURE

INCORPORATION BY REFERENCE

The disclosure of Japanese Patent Application No. 2012-245514 filed on Nov. 7, 2012 including the specification, drawings and abstract is incorporated herein by reference in its entirety.

BACKGROUND OF THE INVENTION

1. Field of the Invention

The present invention relates to a vehicle body front part structure.

2. Description of Related Art

A vehicle body structure is known in which bending parts in a vehicle backward direction on end sides of a dash cross member and front side members are installed with a side member brace (for example, see Japanese Patent Application Publication No. 2003-300484 (JP 2003-300484 A)). Another structure is also known in which a middle part of the suspension member in vehicle width directions that connects right and left side members and base end parts of the side members are connected with a pair of right and left braces that are diagonally arranged (for example, Japanese Patent Application Publication No. 2009-18690 (JP 2009-18690 A)).

However, the technique as described above needs higher strength that is required for an individual frame part such as a rocker and a dash cross member against the backward collision load which is received through a front wheel during short overlap collision, and thus the technique needs the improvement on an increase in weight of the vehicle body in order to secure the strength requirements.

SUMMARY OF THE INVENTION

The invention provides a vehicle body front part structure capable of preventing an increase in the weight of the vehicle body and securing the strength against the collision load that is applied backward through the front wheel during the short overlap collision.

A vehicle body front part structure according to one aspect of the present invention includes: a lower arm that supports a front wheel; a first transverse member that is connected to a supporting part on a rear side of the lower arm in a vehicle body; a second transverse member that connects to a part on front end side of a rocker, the rocker is disposed in a rear of the front wheel; and a connecting structure that integrally connects between the first transverse member and the second transverse member.

According to the aspect described above, the weight of the vehicle body can be prevented from increasing, and the strength against the collision load that is applied backward to the rocker through the front wheel can be secured.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

A vehicle body front part structure 10 according to a first embodiment of the present invention will be described with reference to FIGS. 1 through 5. It should be noted that an arrow FR, an arrow UP, an arrow RH, and an arrow LH, which are appropriately shown in the drawings, respectively indicate a front direction in vehicle forward and backward directions, an upper direction in vehicle vertical directions, the right-hand side when a vehicle faces a travelling direction (one side in vehicle width directions), and the left-hand side when the vehicle faces the travelling direction (the other side in vehicle width directions). Unless otherwise specified, the directions such as the front and rear, upper and lower, and right and left in the following descriptions respectively represent front and back sides in the vehicle forward and backward directions, upper and lower sides in the vehicle vertical directions, and right and left sides when the vehicle faces the travelling direction.

[Basic Structure of Vehicle Front Part]

Figure 1:
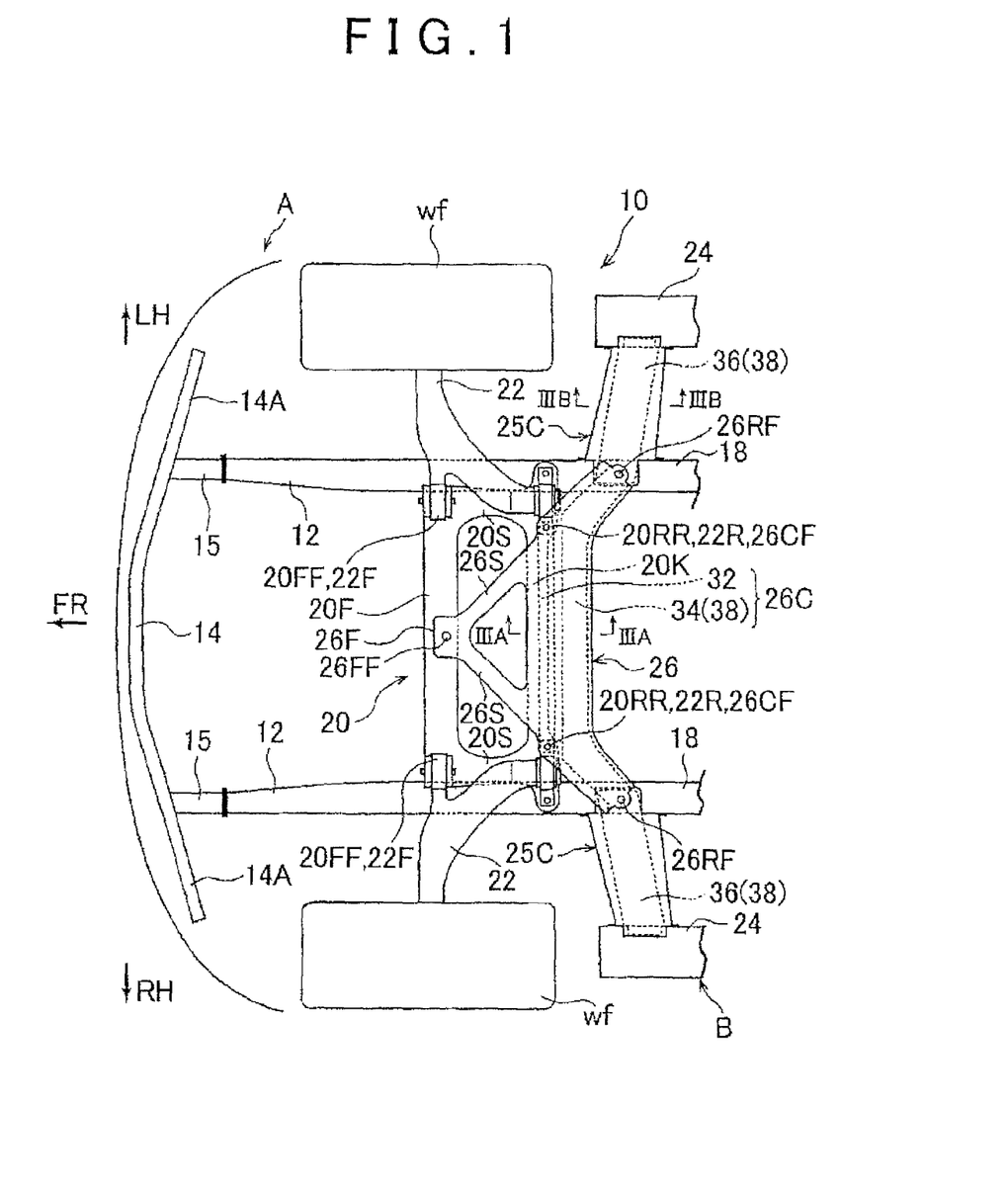
FIG. 1 is a bottom plan view that shows a schematic overall structure of the vehicle body front part structure according to a first embodiment of the present invention.

FIG. 1 shows, in a bottom plan view, a schematic structure of the front part of an automobile A to which the vehicle body front part structure of the present invention is applied. As shown in FIG. 1, a vehicle body B of the automobile A includes a pair of right and left front side members 12. The right and left front side members 12 extend in the forward and backward directions and are arranged in parallel with each other in the vehicle width directions. Front ends of the right and left front side members 12 are connected to a bumper reinforcement 14 extending in the vehicle width directions through crush boxes 15. Ends of the bumper reinforcement 14 in the vehicle width directions are formed to be projecting portions 14A that project from the right and left front side members 12 to outer sides in the vehicle width directions. It should be noted that the structure may have a direct connection between the front ends of the front side members 12 and the bumper reinforcement 14, instead of having the crush boxes 15.

Rear parts of the right and left front side members 12 abut against dash lower panels 16 (see FIG. 3B, not shown in FIG. 1) and connect with under floor reinforcements 18. The under floor reinforcements 18 are formed to be frame members that are joined with lower sides of floor panels 19 (see FIG. 3B, not shown in FIG. 1) and extend in the forward and backward directions. The under floor reinforcements 18 can be considered as the rear parts of the front side members 12. In this embodiment, at least the front side members 12 function as front-and-rear frame members of the present invention, and the front side members 12 and the under floor reinforcements 18 may be considered as the equivalent of the front-and-rear frame members of the present invention.

A suspension member 20 that forms a part of the vehicle body B is disposed under the front side members 12. The suspension member 20 includes a front cross member 20F and a rear cross member 20R that extend in the vehicle width directions. The front cross member 20F and the rear cross member 20R are connected with side rails 20S that extend in the forward and backward directions at the sides in the vehicle width directions and formed in a rectangular frame in a bottom plan view. Right and left front corners of the suspension member 20 are connected to the lower sides of the front side members 12 in generally a center in the forward and backward directions. Right and left rear corners of the suspension member 20 are connected to the rear sides of the front side members 12 (in the vicinity of connecting parts with the under floor reinforcements 18).

Lower arms 22 that constitute front suspensions are supported on the right and left sides of the suspension member 20. Each of the right and left lower arms 22 is supported on the suspension member 20 at two points that are the front and the rear parts of an inner end in the vehicle width direction so as to be capable of angular displacement about an axis along the forward and backward directions. More specifically, supporting parts 20FF that are disposed at ends of the front cross member 20F in the vehicle width direction (front ends of the right and left side rails 20S) support supported parts 22F that are positioned at the front of the lower arms 22 in the suspension member 20. Furthermore, supporting parts 20RR that are disposed at ends of the rear cross member 20R in the vehicle width direction (rear ends of the right and left side rails 20S) support supported parts 22R that are positioned at the rear of the lower arms 22 in the suspension member 20.

The right and left lower arms 22 support front wheels Wf at outer ends in the vehicle width directions through steering knuckles (not shown). Each of the front wheels Wf is supported by the front suspension including the lower arm 22 such that the front wheel Wf can be turned and rotate about its axis.

Rockers 24, which constitute the vehicle body B and are longitudinally elongated frame members, are disposed in the rear of the right and left front wheels Wf. The right and left rockers 24 are connected with outer edges of the floor panels 19 in the vehicle width directions and define lower edges of openings for allowing occupants to get in/out of the vehicle. Although not shown in the drawings, the right and left rockers 24, and a rocker 24 and an under floor reinforcement 18 on the same right or left side are connected with each other at appropriate positions in the forward and backward directions by cross members (not shown).

Figure 3A:
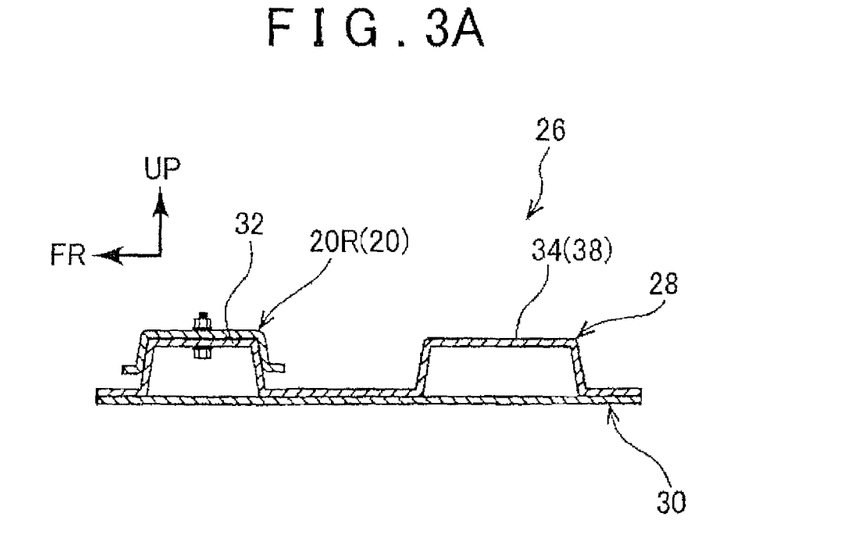
FIG. 3A is a cross-sectional view that is enlarged along the line 3A-3A in FIG. 1.
Figure 3B:
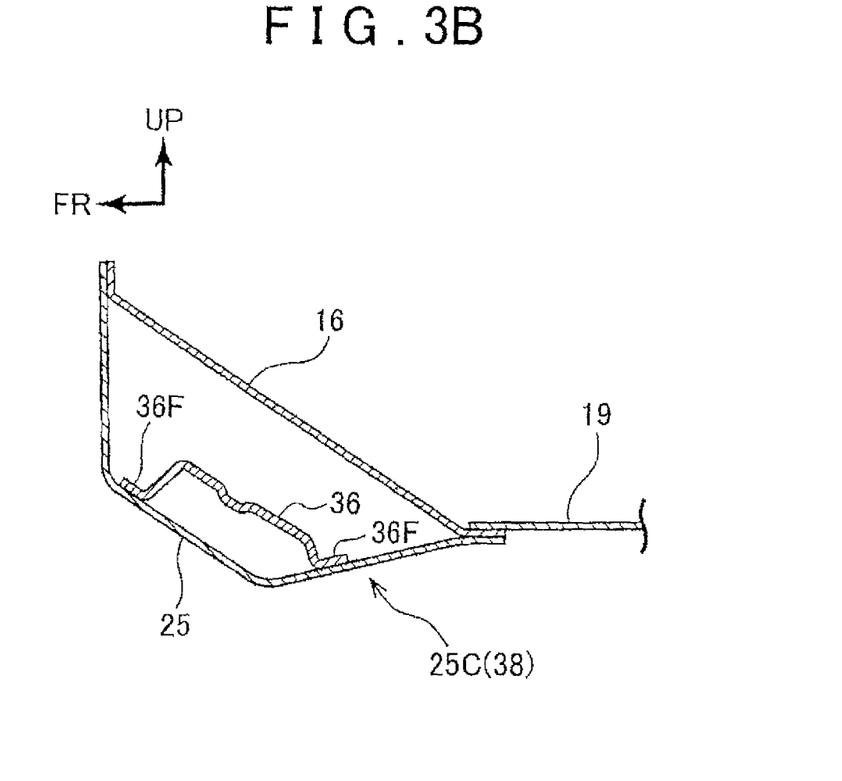
FIG. 3B is a cross-sectional view that is enlarged along the line 3B-3B in FIG. 1.

A torque-box member 25 is provided between a front end of the right or left rocker 24 and a front end of the under floor reinforcement 18 (a connection with a front side member). As shown in FIG. 3B, the torque-box member 25 forms a torque box 25C of a closed sectional structure with the dash lower panel 16. The torque box 25C restricts relative torsion between the rocker 24 and the under floor reinforcement 18 (front side member 12).

[Main Structure]
(Brace)

Figure 2:
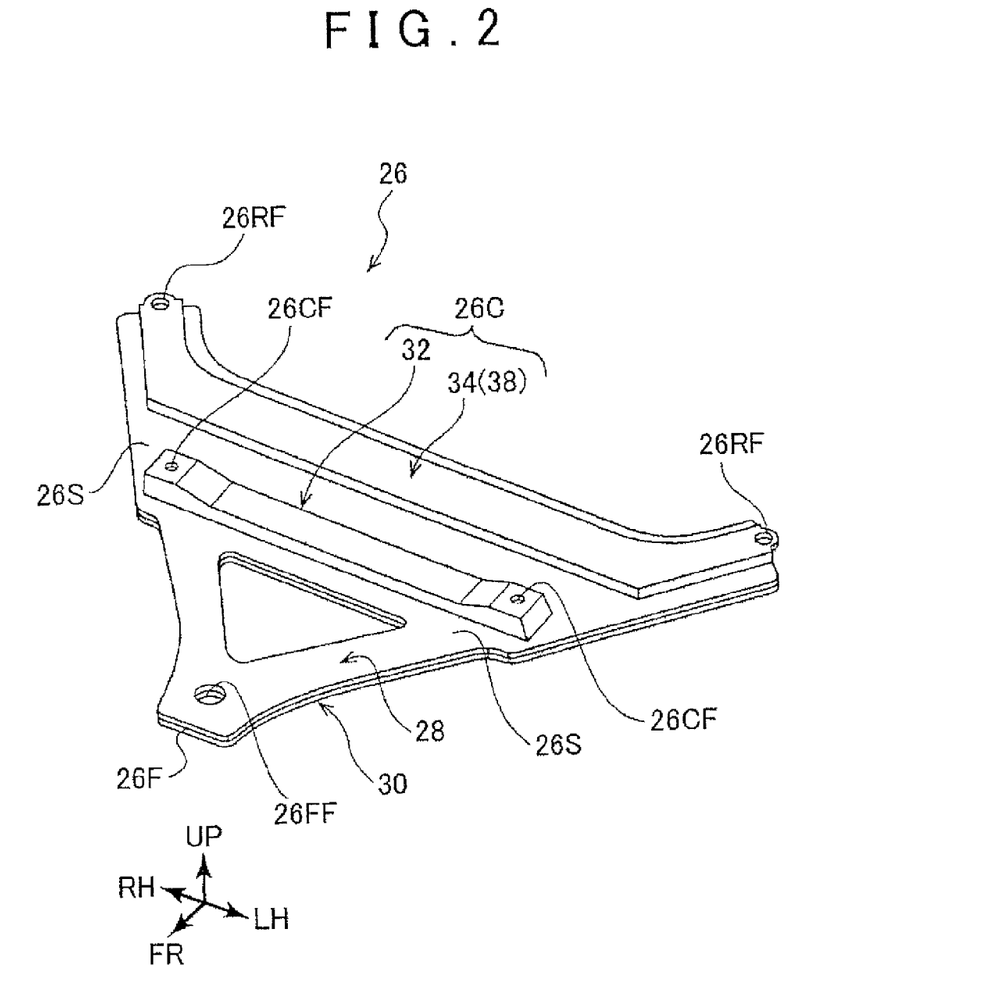
FIG. 2 is a perspective view that is seen from oblique above and shows an enlarged brace which constitutes the vehicle body front part structure according to a first embodiment of the present invention.

The vehicle body B includes a brace (referred to as a "stability brace" in some cases) 26 that improves the stability and controllability of the vehicle. As shown in FIG. 2, the brace 26 roughly forms in a shape of letter "A" that has an apex at the front end in the bottom plan view. More specifically, the brace 26 is formed with a pair of right and left diagonal rail parts 26S that extend from a front end 26F as the apex to diagonally backward directions and a midsection crossing part 26C that extends in the vehicle width directions and connects between the left and right diagonal rail parts 26S as main parts.

The left and right diagonal rail parts 26S has a structure in which the cross section that is orthogonal to each longitudinal direction forms the closed sectional structure. The midsection crossing part 26C has a structure in which the cross section that is orthogonal to the longitudinal direction forms two closed sections in a line in the forward and backward directions. In this embodiment, the brace 26 is constructed by joining an upper panel 28 and a lower panel 30 as shown in FIG. 3A. More specifically, the lower panel 30 is formed in a generally flat plate, and the upper panel 28 is formed in a shape of a combination of hat-like sectional portions that form the closed sections (diagonal rail part 26S and midsection crossing part 26C) in cross section.

As shown in FIG. 2, the brace 26 includes a front crossing part 32 and a rear crossing part 34 that are respectively front and rear closed sectional parts forming the midsection crossing part 26C and connect between the right and left diagonal rail parts 26S (closed sections). Ends of the front crossing part 32 in the vehicle width directions project from the diagonal rail parts 26S to outer sides in the vehicle width directions so as to intersect with the closed sectional parts of the right and left diagonal rail parts 26S. Ends of the rear crossing part 34 in the vehicle width directions are smoothly connected to the rear ends of the right and left diagonal rail parts 26S in a plan view. In other words, the rear ends of the right and left diagonal rail parts 26S can be considered to be integrated (shared) with the ends of the rear crossing part 34 in the vehicle width directions. Furthermore, that is to say, the part can be considered such that the ends of the rear crossing part 34 in the vehicle width directions are curved (bent) toward rear sides and the rear ends of the right and left diagonal rail parts 26S abut against curved portions of the rear crossing part 34.

A front end fixing part 26FF is formed in the front end of the brace 26, that is, a connecting part of the right and left diagonal rail parts 26S. Rear end fixing parts 26RF are formed in the rear ends of the brace 26, that is, the rear ends of the right and left diagonal rail parts 26S (the parts that can be considered as the ends of the rear crossing part 34 in the vehicle width directions as described above). In addition, intermediate fixing parts 26CF are formed between the front end fixing part 26FF and the right and left rear end fixing parts 26RF in the brace 26, that is, in the ends of the front crossing part 32 in the vehicle width directions.

The front end fixing part 26FF is fixed in a center part of the front cross member 20F of the suspension member 20 in the vehicle width direction with a fastener such as a bolt (not shown).

(First Transverse Member)

The right and left intermediate fixing parts 26CF are fixed in the ends of the rear cross member 20R of the suspension member 20 in the longitudinal directions such that the front crossing part 32 connects between the right and left supporting parts 20RR in the suspension member 20. The front crossing part 32 of the brace 26 functions as a first transverse member of the present invention.

(Second Transverse Member)

The right and left rear end fixing parts 26RF are fixed in connecting parts (or in the vicinity thereof) with the torque-box members 25 in the forward and backward directions in the under floor reinforcements 18. Thus, as shown in FIG. 1, a section between the right and left rockers 24 of the vehicle body front part structure 10 is connected by the right and left torque boxes 25C (under floor reinforcements 18) and the rear crossing part 34 of the brace 26 in the bottom plan view.

Reinforcements 36 that connect the rockers 24 to the under floor reinforcements 18 are provided within the right and left torque boxes 25C forming the vehicle body front part structure 10. As shown in FIG. 3B, reinforcement 36 that extends in the vehicle width direction is formed in a generally hat-like cross-sectional shape which opens downward in a cross-sectional view which is orthogonal to the longitudinal direction and joined with the torque-box member 25 at front and rear flanges 36F. Thus, the closed sectional structure is formed by the torque-box member 25 and the reinforcement 36 within the torque box 25C.

In this embodiment, an inter-rocker crossing part 38 that functions as a second transverse member of a three-member structure is constructed with the rear crossing part 34 of the brace 26 as a midsection transverse member and the reinforcement 36 or the torque box 25C which is reinforced with the reinforcement 36 as an end transverse member. The rear crossing part 34 forming the inter-rocker crossing part 38 is connected to the reinforcement 36 (torque box 25C including the reinforcement 36) in the vehicle width direction through the under floor reinforcement 18 so as to be capable of supporting a load.

(Connecting Structure)

The rear crossing part 34 forming the inter-rocker crossing part 38 and the front crossing part 32 being the first transverse member construct a part of the brace 26 that is formed as a single-piece structure by joining the upper panel 28 and the lower panel 30. The single-piece structure in the brace 26 functions as the connecting structure that joins the first transverse member and the second transverse member in the present invention. Thus, when a load in the vehicle width direction is exerted on one of the front crossing part 32 and the rear crossing part 34, the load acts on the other of the front crossing part 32 and the rear crossing part 34 as the load in the vehicle width direction.

Operations in the first embodiment are described next.

The following descriptions will be made of a case where a short overlap collision occurs in a mode in which a colliding body (barrier) collides with only an outer side (projecting portion 14A) in the vehicle width direction of the automobile A to which the vehicle body front part structure 10 with the aforementioned structure is applied, with respect to the front side member 12. In the midterm of such short overlap collision, the front wheel Wf that is located on a collision side in the vehicle width direction (hereinafter, simply referred to as "on a collision side" for some cases) receives a backward load from the barrier.

In the vehicle body front part structure 10, a section between the supporting parts 20RR that support the rear sides of the lower arms 22 in the suspension member 20 is connected in the front crossing part 32 of the brace 26. In other words, the rear cross member 20R of the suspension member 20 is reinforced between the supporting parts 20RR that support the supported parts 22R on the rear sides of the right and left lower arms 22.

Figure 4:
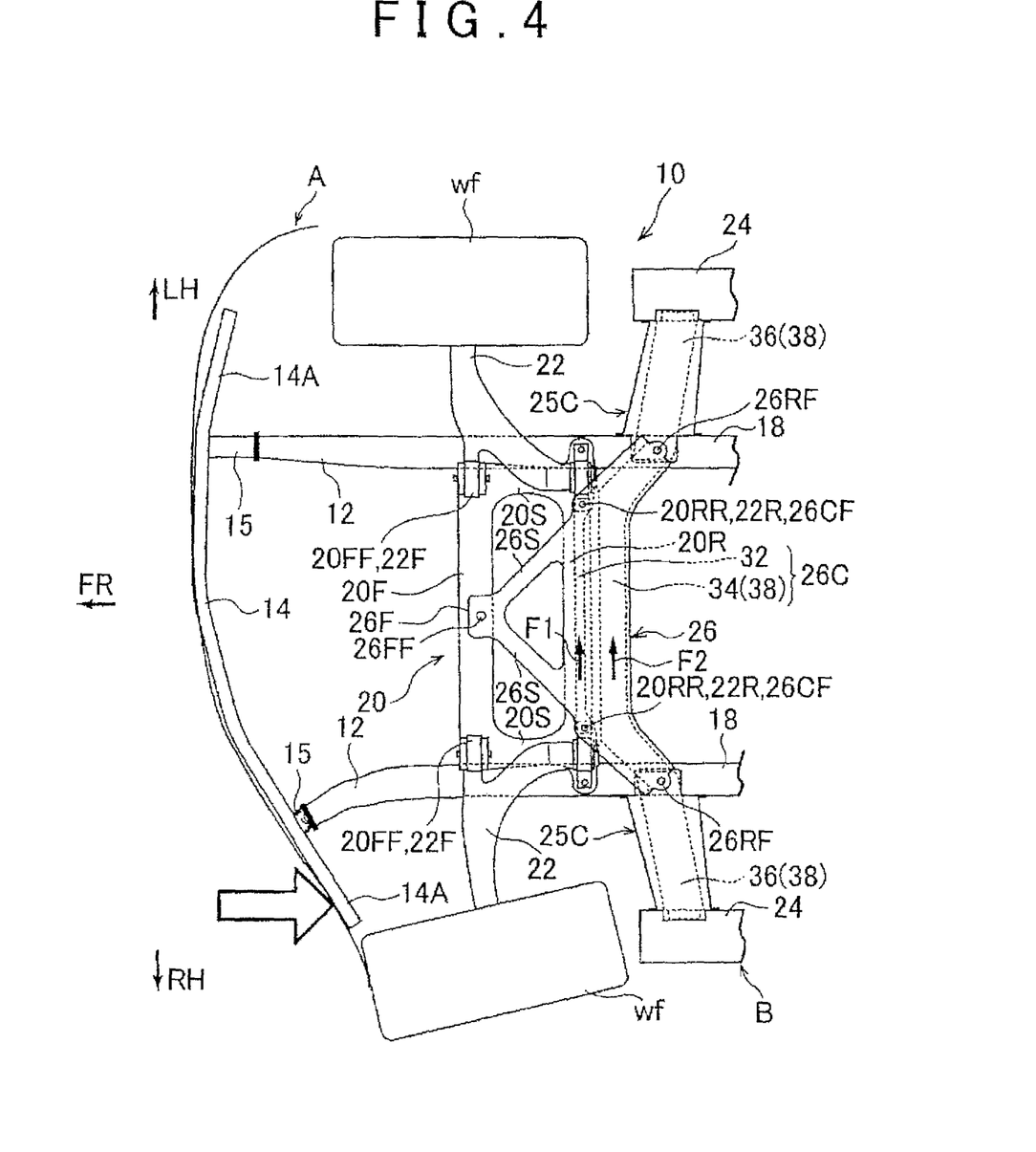
FIG. 4 is a bottom plan view that schematically shows a state in the midterm of short overlap collision for the automobile to which the vehicle body front part structure according to the first embodiment of the present invention is applied.

Thus, the rear cross member 20R of the suspension member 20 is prevented from being bent, and the front wheel Wf on the collision side rotates about the supported part 22R on the rear side of the right and left lower arm 22 on the collision side and is displaced to the rear side (on the side of the rocker 24) as shown in FIG. 4. This causes the application of an inward load in the vehicle width direction from the front wheel Wf on the collision side to the rear cross member 20R and the front crossing part 32 through the lower arm 22. In other words, a part of the backward load from the barrier B is converted to the inward load in the vehicle width direction through the rear cross member 20R of the suspension member 20, and the load is supported by the rear cross member 20R and the front crossing part 32 (see an arrow F1 shown in FIG. 4).

The front crossing part 32 constitutes the brace 26 of the single-piece structure with the rear crossing part 34 that forms the inter-rocker crossing part 38. The single-piece structure enables the front crossing part 32 to connect with the rear crossing part 34. Thus, the inward load in the vehicle width direction from the lower arm 22 during the midterm of the short overlap collision described above is received and supported by the inter-rocker crossing part 38 (see an arrow F2 shown in FIG. 4).

Figure 5:
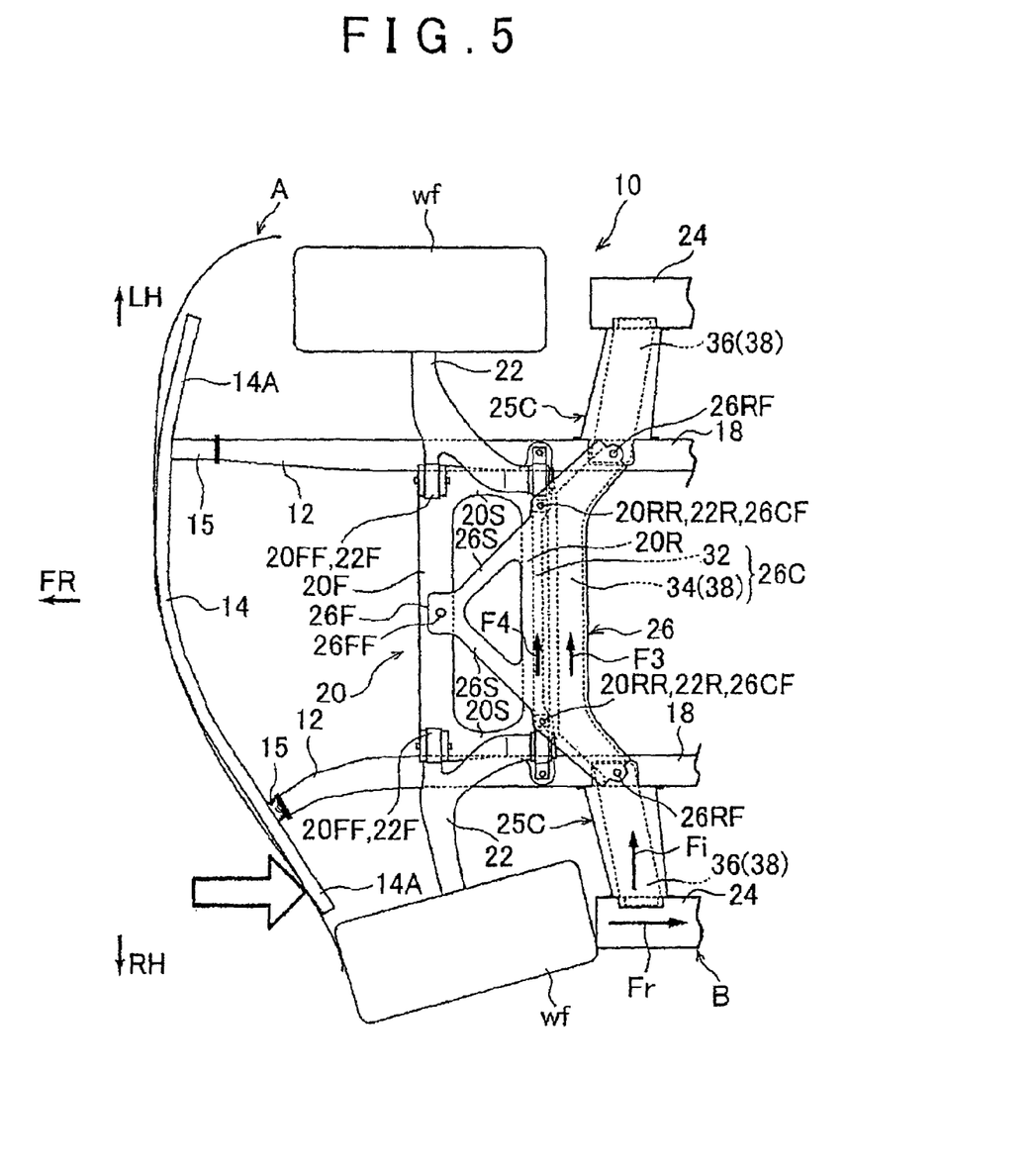
FIG. 5 is a bottom plan view that schematically shows a state in the later term of the short overlap collision for the automobile to which the vehicle body front part structure according to the first embodiment of the present invention is applied.

As shown in FIG. 5, the front wheel Wf rotating on the collision side and displaced to the rear side comes into contact with the front end of the rocker 24 from the diagonally outside in the later term of the short overlap collision. That is to say, a load Fr as a component toward the rear side and a load Fi as a component toward the inner side in the vehicle width direction (resultant force) are exerted from the front wheel Wf to the rocker 24. In other words, the rocker 24 receives a rocker compressive load Fr and a rocker bending load Fi.

In the vehicle body front part structure 10, a section between the front ends of the right and left rockers 24 is connected by the inter-rocker crossing part 38. Thus, a part of the rocker bending load Fi is supported from the inner side in the vehicle width direction by the reinforcement 36 (torque box 25C reinforced with the reinforcement 36) and the rear crossing part 34 that form the inter-rocker crossing part 38 (see an arrow F3 shown in FIG. 5). The inter-rocker crossing part 38 is connected to the front crossing part 32 in the rear crossing part 34, and thus the other part of the rocker bending load Fi on the rocker 24 is received and supported by the front crossing part 32 (see an arrow F4 shown in FIG. 5).

As described above, in the vehicle body front part structure 10, the front crossing part 32 and the inter-rocker crossing part 38 that are arranged in parallel in the front and rear sides share and support the inward load in the vehicle width direction that is applied through the front wheel Wf (toward an opposite side of the collision) in the midterm and latter term of the short overlap collision. In other words, the front crossing part 32 and the inter-rocker crossing part 38 support each other and efficiently share the applied load from the front wheel Wf.

Thus, the overall vehicle body B can be reduced in weight in comparison with a structure in which one frame part receives the load and thus collision performance (strength) against the short overlap collision is secured. That is to say, the overall vehicle body B can be reduced in weight in comparison with a comparative example in which the yield strength against the rocker bending load Fi is secured with the rocker only, for example. Additionally, the overall vehicle body B can be reduced in weight in comparison with a comparative example in which the yield strength against the rocker bending load Fi is secured by reinforcing a single frame member such as a dash cross member that connects between the right and left rockers, for example.

As described above, in the vehicle body front part structure 10 according to the first embodiment, the weight of the vehicle body B can be prevented from increasing, and the strength against the short overlap collision (load) can be secured, in comparison with a comparative example in which one frame part such as the rocker or the dash cross member collectively receives the load.

In the vehicle body front part structure 10, the front crossing part 32 that is a different member from the suspension member 20 for supporting the right and left front wheels Wf through the lower arms 22 connects between the right and left supporting parts 20RR in the rear cross member 20R of the suspension member 20. Thus, the front crossing part 32 can be provided in order to achieve the required strength against the short overlap collision independently of the design (such as functions and strength) of the suspension member 20 (without affecting the design). In other words, the automobile A that includes the existing suspension member 20 can be provided with measures against the short overlap collision.

Furthermore, the inter-rocker crossing part 38 is constructed with three members including the rear crossing part 34 that forms the middle part of the inter-rocker crossing part 38 and the reinforcements 36 that form the right and left ends (torque boxes 25C reinforced with the reinforcements 36). Consequently, the inter-rocker crossing part 38 can be constructed by effectively using a space between the rocker 24 and the under floor reinforcement 18 under the floor (while the projection lower than the rocker 24 or other parts is prevented or restricted).

In this embodiment, the vehicle body front part structure 10 is constructed by using the brace 26 for improving the stability and the controllability which is formed by connecting each parts including the front crossing part 32 and the rear crossing part 34. Thus, in the automobile A that includes the brace 26 for improving the stability and the controllability, the first transverse member and the second transverse member can be constructed, while the number of parts count is reduced.

Hereinafter, other embodiments will be described in turn. It should be noted that the same reference numerals and symbols are given to basically the same structure as that of the embodiment previously described, and the description and the illustration thereof may not be repeated in some cases.

Second Embodiment

Figure 6:
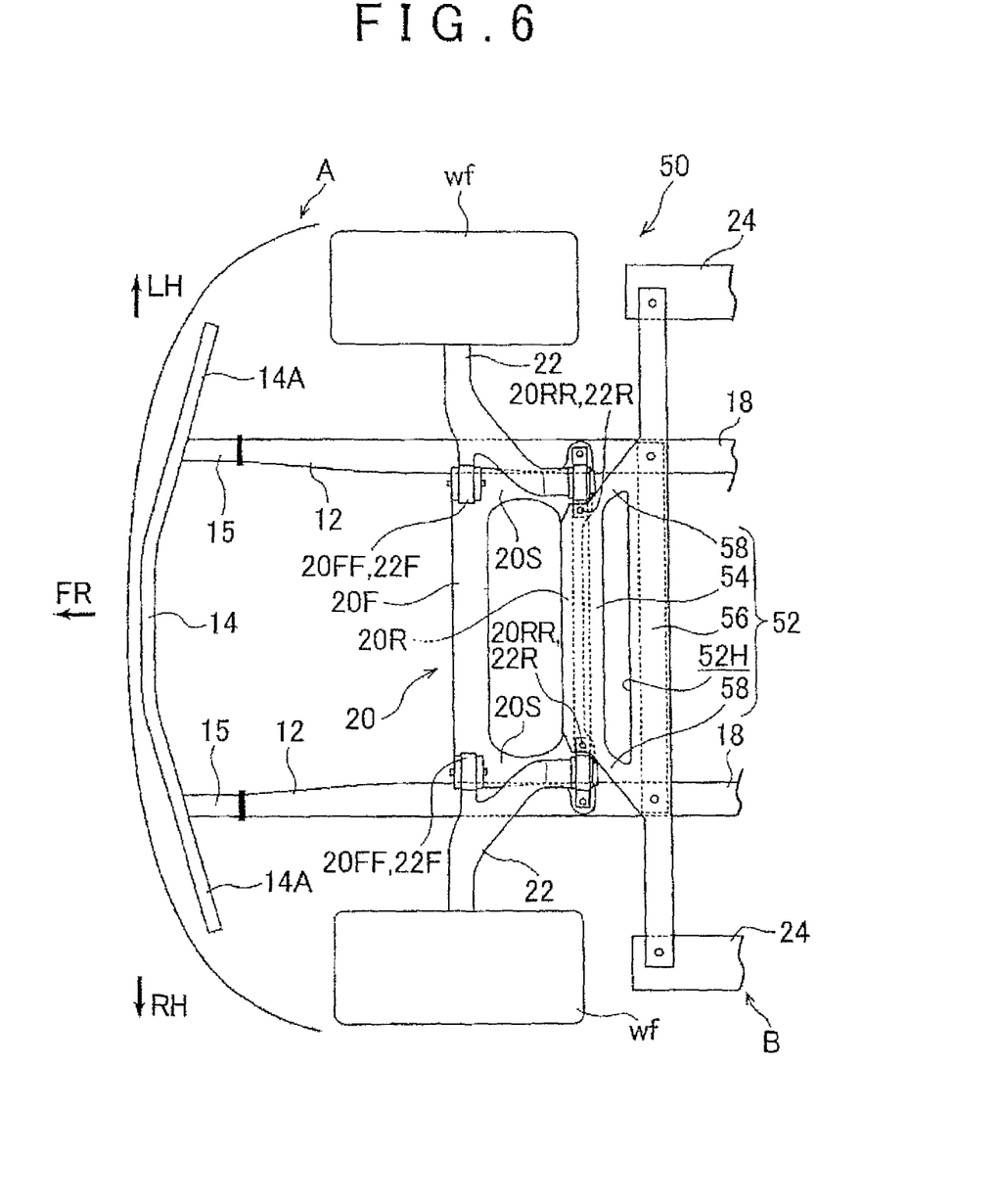
FIG. 6 is a bottom plan view that shows a schematic overall structure of the vehicle body front part structure according to a second embodiment of the present invention.

A vehicle body front part structure 50 according to a second embodiment of the present invention will be described with reference to FIG. 6. FIG. 6 shows, in a bottom plan view, a schematic structure of the front part of the automobile A to which the vehicle body front part structure 50 is applied. As shown in FIG. 6, the vehicle body front part structure 50 is different from the vehicle body front part structure 10 according to the first embodiment in terms of including an integrated brace 52 instead of the brace 26 and the reinforcement 36.

The integrated brace 52 is formed as one member in its entirely by integrally connecting an inter-arm crossing part 54 as the first transverse member and an inter-rocker crossing part 56 as the second transverse member with connecting parts 58 as the connecting structure.

The inter-arm crossing part 54 connects between the right and left supporting parts 20RR of the rear cross member 20R in the suspension member 20. The inter-rocker crossing part 56 is formed as one member structure independently across the right and left rockers 24 and connects between the front ends of the right and left rockers 24. In this embodiment, the inter-rocker crossing part 56 is joined to the right and left rockers 24 from below and also joined to the under floor reinforcements 18 from below at two points in the midsection in the longitudinal (vehicle width) directions.

The connecting parts 58 connect the ends of the inter-arm crossing part 54 in the longitudinal directions to junctions (vicinity of junctions) of the inter-rocker crossing part 56 and the under floor reinforcements 18. Thus, a hole section 52H enclosed with the inter-arm crossing part 54, the inter-rocker crossing part 56, and the right and left connecting parts 58 is formed in the middle part of the integrated brace 52. Other structures in the vehicle body front part structure 50 are the same as the corresponding structures of the vehicle body front part structure 10.

In the vehicle body front part structure 50, the inter-arm crossing part 54 that connects between the right and left supporting parts 20RR is connected to the inter-rocker crossing part 56 that connects between the front ends of the right and left rockers 24. Consequently, the vehicle body front part structure 50 can also achieve the effect of reducing the weight of the overall vehicle body B by receiving and supporting the load from the short overlap collision on the applying automobile A as is the case with the vehicle body front part structure 10.

In the vehicle body front part structure 50, the inter-rocker crossing part 56 is formed to be one member, and thus the inter-rocker crossing part 56 can satisfactorily be assembled to the vehicle body B. Specifically, the inter-rocker crossing part 56, the inter-arm crossing part 54, and the right and left connecting parts 58 form the integrated brace 52 as one member in its entirely before the assembly to the vehicle body B. Thus, those components can satisfactorily be assembled to the vehicle body in comparison with the comparative example in which those components are formed as other members.

Third Embodiment

Figure 7:
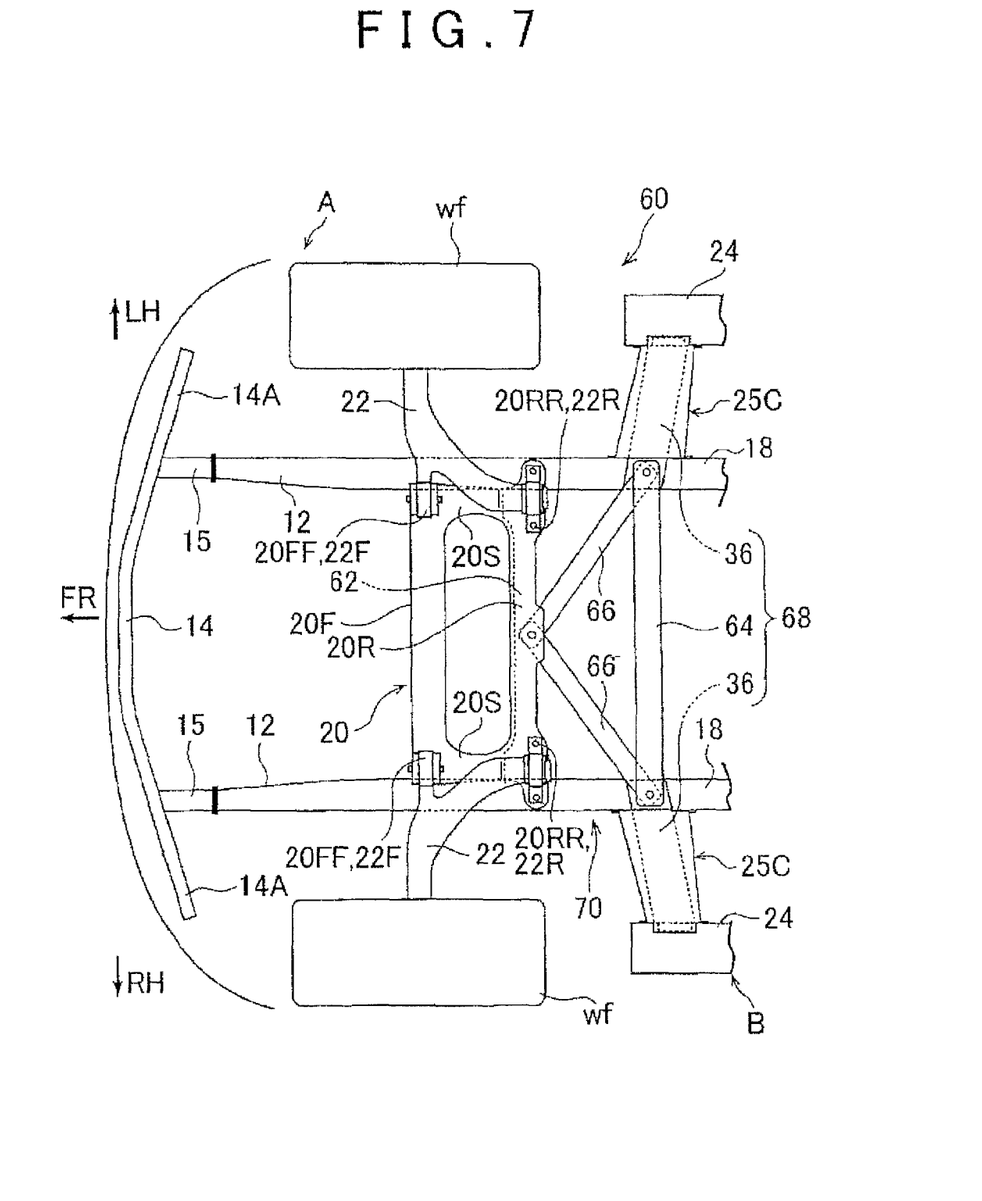
FIG. 7 is a bottom plan view that shows a schematic overall structure of the vehicle body front part structure according to a third embodiment of the present invention.

A vehicle body front part structure 60 according to a third embodiment of the present invention will be described with reference to FIG. 7. FIG. 7 shows, in a bottom plan view, a schematic structure of the front part of the automobile A to which the vehicle body front part structure 60 is applied. As shown in FIG. 7, the vehicle body front part structure 60 is different from the vehicle body front part structure 10 according to the first embodiment in terms of including a reinforcement structure 62 of the suspension member 20, a midsection crossing part 64, and a pair of right and left diagonal braces 66 instead of the brace 26.

In the reinforcement structure 62, for example, a section between the right and left supporting parts 20RR in the rear cross member 20R is formed to have higher strength than other parts by means of the reinforcement such as attaching steel sheets to the rear cross member 20R of the suspension member 20 made of aluminum or aluminum alloys. The reinforcement structure 62 may be capable of reinforcing the section between the right and left supporting parts 20RR in the rear cross member 20R. The reinforcement with a shape such as an additional rib in the rear cross member 20R may be adapted instead of the reinforcement with other members, for example. The rear cross member 20R reinforced in such a manner functions as the first transverse member in the present invention.

The midsection crossing part 64 is formed to extend in the vehicle width directions and connects between the connecting sections with the reinforcements 36 (torque boxes 25C) in the forward and backward directions at the right and left under floor reinforcements 18. Although not shown in the drawing, the midsection crossing part 64 forms the closed sectional structure with the floor panel 19. The midsection crossing part 64 and the right and left reinforcements 36

(torque boxes 25C reinforced with the reinforcements 36) constitute the inter-rocker crossing section 68 of the three-member structure as the second transverse member.

The pair of right and left diagonal braces 66 connect between the middle part of the rear cross member 20R in the vehicle width direction and the connecting parts of the midsection crossing part 64 with the right and left under floor reinforcements 18. The diagonal braces 66 function as braces for a rectangular frame part 70 that is formed with the rear cross member 20R of the suspension member 20, the midsection crossing part 64 of the inter-rocker crossing section 68, and the right and left under floor reinforcements 18. In other words, the right and left diagonal braces 66 are formed to join the rear cross member 20R and the midsection crossing part 64 so that the rectangular frame part 70 which is formed with the rear cross member 20R and the midsection crossing part 64 is prevented from deforming (matchbox-like deformation being a parallelogram in a plan view).

Other structures in the vehicle body front part structure 60 are the same as the corresponding structures of the vehicle body front part structure 10.

In the vehicle body front part structure 60, the rear cross member 20R in which the section between the right and left supporting parts 20RR is reinforced with the reinforcement structure 62 and the midsection crossing part 64 that constitutes the inter-rocker crossing section 68 are joined with the pair of right and left diagonal braces 66. Consequently, the vehicle body front part structure 60 can also achieve the effect of reducing the weight of the overall vehicle body B by receiving and supporting the load from the short overlap collision on the applying automobile A as is the case with the vehicle body front part structure 10.

As a supplementary description of load sharing in the vehicle body front part structure 60 during the short overlap collision, the diagonal braces 66 prevents the matchbox-like deformation of the rectangular frame part 70 that includes the rear cross member 20R and the midsection crossing part 64. Thus, the displacement of the rear cross member 20R that receives the load F1 with respect to the midsection crossing part 64 in the vehicle width direction can be prevented, and the inter-rocker crossing section 68 receives and supports the load F2. In the same manner, the displacement of the midsection crossing part 64 that receives the load F3 with respect to the rear cross member 20R in the vehicle width direction can be prevented, and the rear cross member 20R receives and supports the load F4. It should be noted that FIGS. 4 and 5 which show the states in the midterm and the later term of the short overlap collision on the first embodiment will be referred to for the loads F1, F2, F3, and F4.

In the vehicle body front part structure 60, the first transverse member is constructed through the reinforcement of the rear cross member 20R of the suspension member 20. That is to say, the first transverse member can be formed by effectively using the existing parts in the vehicle body 13.

It should be noted that the third embodiment has been described for an example that includes the pair of right and left diagonal braces 66 as the connecting structure; however, the present invention is not limited to this example. For example, the present invention may have a structure in which the rear cross member 20R and the midsection crossing part 64, in addition to the pair of right and left diagonal braces 66, are connected at the ends in the vehicle width direction with a pair of right and left connecting braces that extends in the forward and backward direction.

In the third embodiment, the inter-rocker crossing part 56 may be used instead of the inter-rocker crossing section 68. More specifically, the present invention may have a structure in which the right and left connecting parts of the inter-rocker crossing part 56 with the under floor reinforcements 18 and the middle part of the rear cross member 20R that is reinforced with the reinforcement structure 62 in the vehicle width direction are connected by the right and left diagonal braces 66.

Additionally, the above embodiments have been described for the examples in which the vehicle body front part structures 10, 50, and 60 include the suspension member 20 that forms a rectangular frame in a plan view; however, the present invention is not limited to these examples. For example, the present invention may adapt other shapes (other types of suspension members (subframes)). Therefore, the present invention is not limited to the structure in which the first transverse member such as the front crossing part 32 and the inter-arm crossing part 54 is provided to (along) the frame part corresponding to the rear cross member 20R and may have a structure in which a section between the supported parts 22R on the rear side of the lower arms 22 is directly connected to each other.

In addition, it is understood that the present invention can be implemented in various forms without departing from the gist of the present invention.

What is claimed is:

1. A vehicle body front part structure comprising:
a lower arm supporting a front wheel;
a pair of right and left front-and-rear frame members extending along the vehicle forward and backward directions and arranged on inner sides in a vehicle width direction with respect to a rocker, the pair of right and left front-and-rear frame members being parallel with respect to each other in the vehicle width direction;
a first transverse member connected to a supporting part on a rear side of the lower arm in a vehicle body;
a second transverse member connected to a part on a front end side of the rocker, the second transverse member including:
a midsection transverse member connected between the pair of right and left front-and-rear frame members, and
a pair of end side transverse members that respectively connect between the pair of right and left front-and-rear frame members and the front end side of the rocker; and
a connecting structure integrally connected between the first transverse member and the second transverse member, wherein
the second transverse member is disposed at a rear of the first transverse member, and
the rocker is disposed at a rear of the front wheel.

2. The vehicle body front part structure according to claim 1, further comprising:
a suspension member supporting the lower arm so as to be capable of angular displacement about an axis along the vehicle forward and backward directions, wherein
the first transverse member connects to the supporting part on rear sides of the lower arm of the suspension member.

3. The vehicle body front part structure according to claim 1, further comprising:
a brace integrally formed and including:
a front crossing part connected to the supporting part on the rear side of the lower arm, and
a rear crossing part connecting between the pair of right and left front-and-rear frame members in the backwards direction of the vehicle with respect to the front crossing part, wherein the first transverse member is formed to be the front crossing part, and the midsection transverse member of the second transverse member is formed to be the rear crossing part.

4. The vehicle body front part structure according to claim 1, wherein the second transverse member is constructed with one member that is connected on the front end of the rocker.

5. The vehicle body front part structure according to claim 1, wherein the first transverse member reinforces the supporting part on the rear side of the lower arm in the suspension member with a reinforcement structure and connects a reinforced part with the reinforcement structure to the second transverse member through the connecting structure.

6. A vehicle body front part structure according to claim 1, wherein
 the lower arm is a pair of right and left lower arms;
 the rocker is a pair of right and left rockers;
 the first transverse member connects between each supporting part on a rear side of the pair of right and left lower arms; and
 the second transverse member connects between each part on a front end of each of the pair of right and left rockers.

* * * * *